United States Patent [19]

Allan et al.

[11] Patent Number: 5,132,549
[45] Date of Patent: Jul. 21, 1992

[54] METHOD AND APPARATUS FOR THE CONTINUOUS FORMATION OF AN EXTRUDED PRODUCT

[75] Inventors: Peter S. Allan, Iver; Michael J. Bevis, Uxbridge, both of England

[73] Assignee: National Research Development Corporation, London, United Kingdom

[21] Appl. No.: 571,613

[22] PCT Filed: Jan. 9, 1990

[86] PCT No.: PCT/GB90/00025

§ 371 Date: Aug. 31, 1990

§ 102(e) Date: Aug. 31, 1990

[87] PCT Pub. No.: WO90/08024

PCT Pub. Date: Jul. 26, 1990

[30] Foreign Application Priority Data

Jan. 10, 1989 [GB] United Kingdom ............... 8900434

[51] Int. Cl.⁵ ............................................. B29C 71/00
[52] U.S. Cl. ........................................ 264/70; 264/108; 264/177.16; 264/209.8; 425/327; 425/340; 425/343; 425/392; 425/394
[58] Field of Search ........... 264/23, 24, 40.1, 40.5, 264/40.6, 40.7, 69, 70, 108, 177.1, 177.16, 209.1, 209.8, 349; 425/327, 340, 343, 392, 394

[56] References Cited

U.S. PATENT DOCUMENTS

| | | | |
|---|---|---|---|
| 3,535,737 | 10/1970 | Hendry | 366/75 |
| 3,555,128 | 1/1971 | Schrenk | 264/40.7 |
| 4,056,591 | 11/1977 | Goettler et al. | 264/108 |
| 4,789,511 | 12/1988 | Bilgin | 264/108 |
| 4,919,870 | 4/1990 | Ibar | 264/70 |
| 4,925,161 | 5/1990 | Allan et al. | 264/69 |

FOREIGN PATENT DOCUMENTS

| | | |
|---|---|---|
| 188120 | 7/1986 | European Pat. Off. . |
| 339184 | 11/1989 | European Pat. Off. . |
| 2319254 | 10/1974 | Fed. Rep. of Germany ........ 264/70 |
| 3801574 | 8/1989 | Fed. Rep. of Germany . |
| 1575159 | 7/1969 | France . |
| 138523 | 11/1979 | German Democratic Rep. . |
| 52-6761 | 1/1977 | Japan .............................. 264/108 |
| WO86/07285 | 12/1986 | PCT Int'l Appl. . |
| WO88/04228 | 6/1988 | PCT Int'l Appl. . |
| 429145 | 7/1967 | Switzerland . |
| 2085461 | 12/1984 | United Kingdom . |
| 2170142 | 7/1986 | United Kingdom . |

*Primary Examiner*—Leo B. Tentoni
*Attorney, Agent, or Firm*—Cushman, Darby & Cushman

[57] ABSTRACT

In a method and apparatus for formation of an extruded product from material containing fibrous, molecules or other constituents succeptable to alignment, while the extrudate is still molten and moving through the die (5), in the direction of the extrusion axis (11), it is subjected to pulsating displacements in a direction transverse relative to that axis. These displacements give rise to a shearing action within the material, resulting in a degree of transverse orientation of the constituents. This orientation may be "locked in" to the extruded product when the melt solidifies (40), so improving the transverse strength of that product, and/or may correct an unwanted orientation (from 112, FIG. 16) that existed in the melt upstream of the point where the pulsating displacements were applied. The displacements may be applied by the synchronized operation of pistons (20-27), operating in chambers (17) which open into the die cavity (18) at separated locations all lying in the same transverse plane. The extrusion of products of rectangular, tubular and other sections is described, as are various methods (8a, 8b, 9, 10, 37) of applying forced cooling to the die to accelerate the solidification of the molten product.

25 Claims, 7 Drawing Sheets

METHOD AND APPARATUS FOR THE CONTINUOUS FORMATION OF AN EXTRUDED PRODUCT

BACKGROUND OF THE INVENTION

This invention relates to the continuous formation, by extrusion, of a product in which constituent elements, normally randomly oriented, are capable of alignment or other ordered orientation to enhance the strength, formability or other useful quality of the extruded product. The invention applies particularly to the formation of extruded products from composite materials comprising a plastics base, for instance polypropylene or nylon, and a fibrous filler such as glass or carbon fibre or a particulate organic or inorganic filler, for example ceramic particles in the form of platelets. Examples of such compositions are described in our patent specification GB-B-2085461. The invention also applies, however, to the continuous formation of products from homogeneous materials, the molecular or other structure of which is capable of undergoing useful physical orientation. The inventions thus applies, for example, to the formation of products from thermoplastic semicrystalline polymer materials which can be effectively oriented, such as homo- or copolyolefins. It also applies to the removal of unwanted orientation effects which may be produced in conventional extrusions, for instance where a melt has to be separated and then recombined within the die prior to expulsion.

Methods and apparatus for achieving useful alignment of fibres or other constituents within moulded products have already been proposed, for example in our patent specification GB-A-2170142, but the process of continuous formation by extrusion poses problems which do not have to be addressed in the formation of a one-off product within a closed mould. Amongst these problems, of course, is the continuous movement of the product and its change of state as it moves.

BRIEF DESCRIPTION OF THE DRAWINGS

The invention is defined by the claims, the content of which are to be read as included within the disclosure of this specification. The invention will now be described, by way of example, with reference to the accompanying diagrammatic drawings, in which:

DESCRIPTION OF THE PREFERRED EMBODIMENTS

Figure 1:
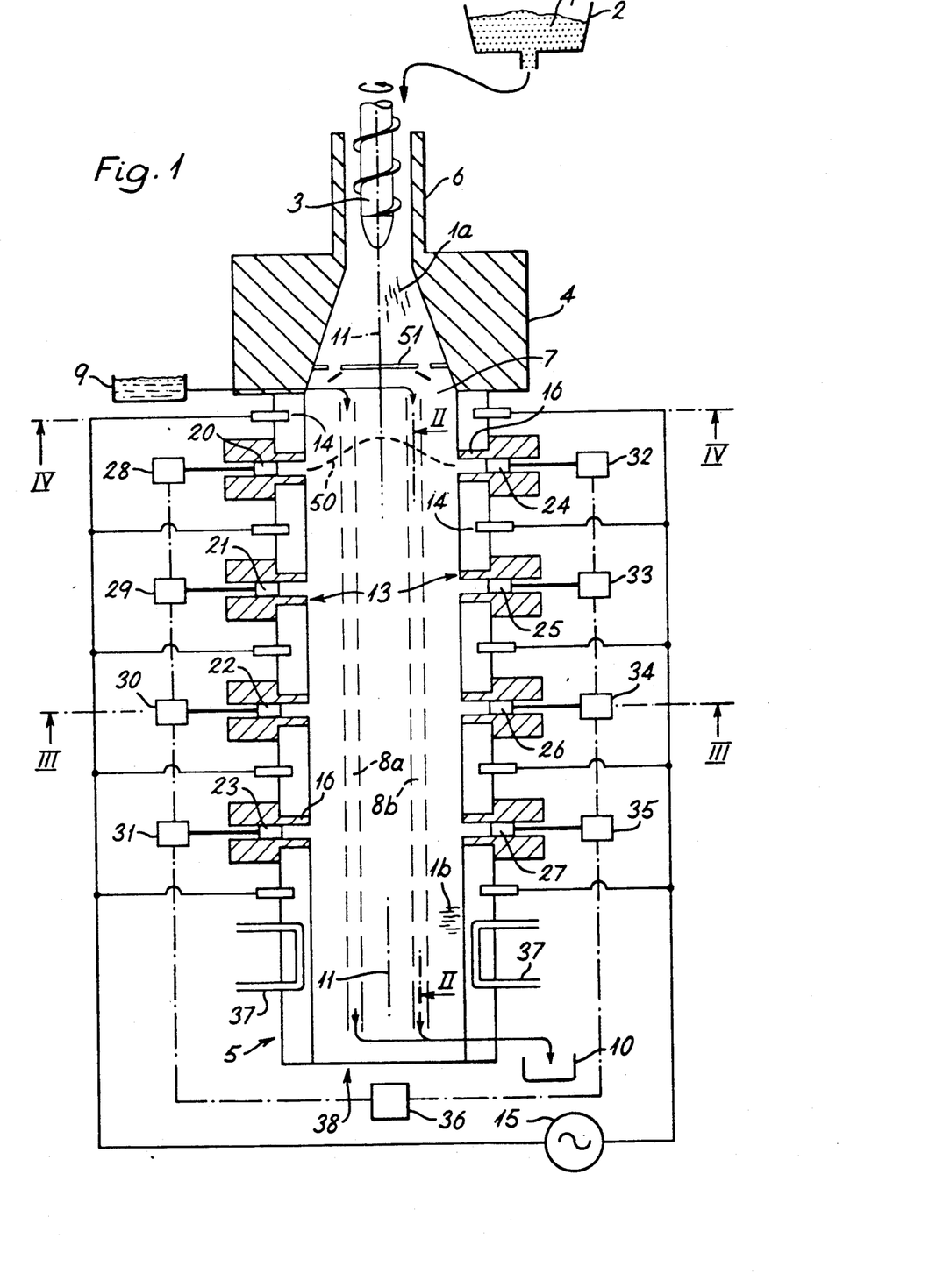
FIG. 1 is a diagrammatic longitudinal section through the first and second parts of an extrusion die as extrusion proceeds.
Figure 2:
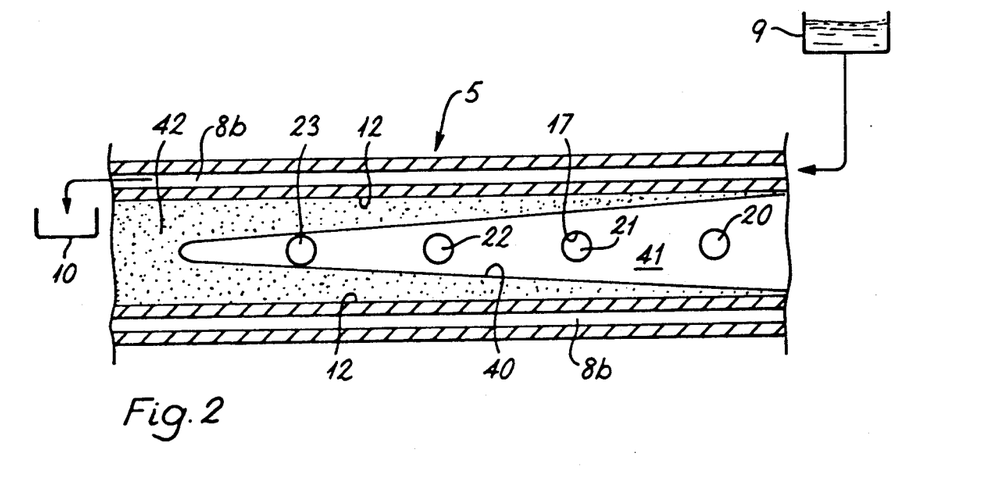
FIG. 2 is a section on the line II—II in FIG. 1.
Figure 3:
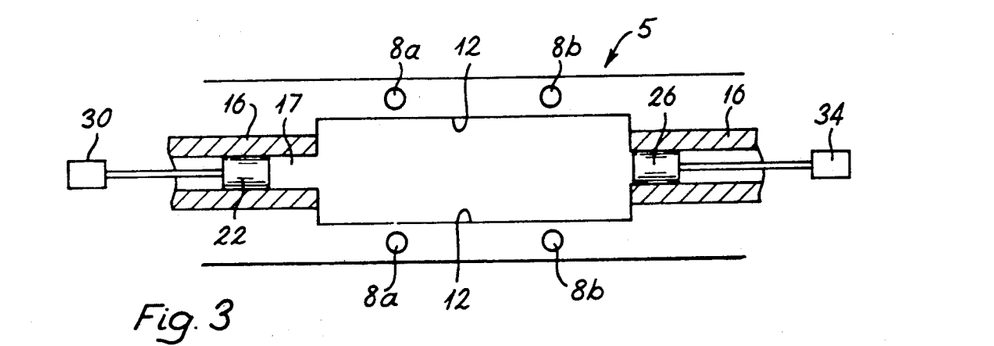
FIG. 3 is a section on the line III—III in FIG. 1.
Figure 4:
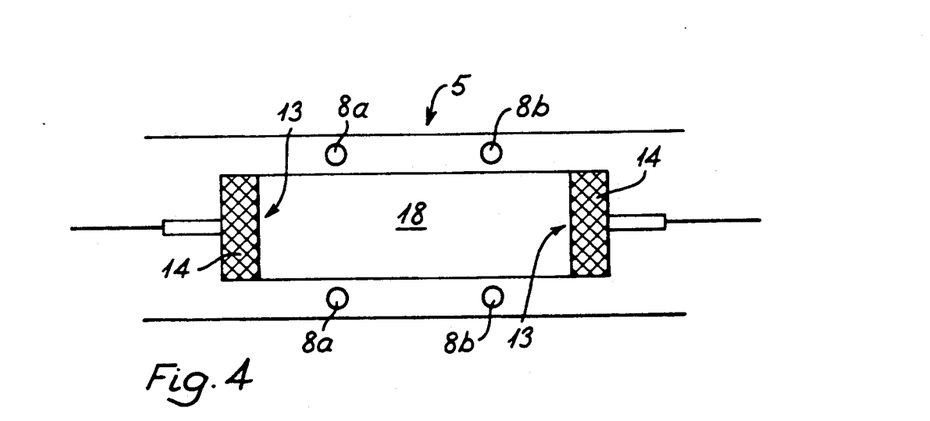
FIG. 4 is a section on the line IV—IV in FIG. 1.

A composite product comprising polypropylene filled with aligned glass fibres is formed by continuously feeding feedstock 1, comprising a mixture of polypropylene granules and the fibres, from a hopper 2 to an extruder screw 3. The screw plasticises the polypropylene, mixes the fibres into the resulting melt evenly but with random orientation, and provides the head pressure necessary to extrude the melt through a die in two parts, 4 and 5. In the first die part 4 the cross-section of the melt changes and reduces from the circular diameter of the screw housing 6 at the inlet end of part 4 to a broad but shallow rectangle at the outlet end 7.

Throughout its length, the cavity of the second part 5 has the same cross-section as the outlet 7 of the first part 4. Cooling ducts 8a and 8b, through which cooling liquid flows between a controlled-temperature source 9 and a drain 10, are embedded into the structure of die part 5 so that they run parallel to the extrusion axis 11 and close to the die surfaces 12 that define the longer sides of the rectangular cross-section. In practice it is likely to be important that ducts 8a and 8b are arranged in parallel between source 9 and drain 10, and not in series, so that they exert an equal and even cooling effect upon the extrudate. Arrangement in series would tend to cause the duct closest to source 9 to exert the greater cooling effect, so promoting a lopsided cooling effect. Along the surfaces 13 of the die cavity that define the opposite and shorter sides of the section, electrical heating elements 14, connected to a common source of power 15 alternate with inset plugs 16 each formed with a cylindrical bore 17 which opens directly into the cavity 18 of part 5. FIG. 1 shows four such plugs 16 located in axial succession along one surface 13 of part 5, and another four located similarly on the opposite surface, making eight in all. Pistons 20-27, controlled by operating mechanisms 28-35, are mounted to reciprocate within the bores 17, and regulating means 36 control and co-ordinate the operation of mechanisms 28 to 35. Downstream of the final plugs 16 and heating elements 14 cooling ducts 37 are formed in the structure of die part 5 adjacent the two shorter surfaces 13 of cavity 18, and the final extruded product emerges continuously from the open end 38 of the cavity 18.

As the extrudate is driven continuously down the length of part 5 by the screw 3, the combined effect upon it of the cooling of the longer cavity surfaces 12 by ducts 8, and the heating of the shorter cavity surfaces 13 by elements 14, is that a "V"-shaped interface 40, substantially constant as to its axial location, forms between the part of the extrudate that is still a liquid melt (41) and the part (42) that has solidified. This "V"-shaped interface extends across substantially the whole of the side-to-side width of part 5, but the heating elements 14 ensure that the extrudate remains molten adjacent the surfaces 13, so that the mouths of the bores 17 confront molten extrudate, which also extends into the bores themselves. Regulating means 36 control the operating mechanisms 28-35 to synchronize the reciprocation of pistons 20-27, so that as at least one of the pistons (20-23) to one side of the die cavity 18 advances, one of those (23-27) to the other side withdraws. Typically the regulating means will operate to control the mechanisms 28-35 so that all eight of the pistons are in motion together, pistons 24-27 withdrawing as pistons 20-23 advance, and vice versa. The effect of such synchronised movements is to superimpose lateral movements upon the basically axial movement of the extrudate, by displacing masses of the extrudate to and fro across the width of the cavity 18. Each of these masses of course carries alignable elements within it, and when those transversely-moving elements pass close to the interface 40 the resulting shearing action first aligns them in the direction in which they are travelling within the liquid melt 41 and then, as they pass over the interface 40, fixes them in that alignment within the solidified part 42. Reference 1a indicates glass fibres aligned generally longitudinally within the feedstock 1 as it flows through the die upstream of its exposure to the action of pistons 20-27, and reference 1b the more transverse alignment of such fibres, within the solid 42, after such exposure.

A simple form of control of the operating mechanisms 28-35 by regulating means 36 has been described, in which the movements of pistons 20-23 are synchronized and those of pistons 24-27 are synchronized in anti-phase, but other modes of operation of the pistons are of course possible to promote different patterns of element alignment. For example, if only pistons 20, 22, 25 and 27 operate so that 20 and 22 advance while 25 and 27 retreat, and then vice versa, the direction of the motion of the displaced masses of extrudate as they travel to and fro across the width of cavity 18 will be at an angle to the transverse dimension, rather than along the dimension itself, so promoting a different alignment of the elements in the solid 42 once they have been subjected to the shearing and fixing processes already described.

With apparatus only as so far described, there is a risk that when the pistons 20-27 move, the resulting forces upon the molten extrudate may tend not only to promote transverse alignment of elements within it. Because the molten extrudate is contained behind the solid 42, the forces exerted upon it by pistons 20-27 may also have some effect of tending to expel it backwards, towards the screw 3. This is obviously undesirable in all ways, and particularly because it could tend to promote a curved transverse alignment of elements within the molten extrudate (as shown schematically at 50 in FIG. 1) instead of the preferred straight alignment in a direction at right angles to extrusion axis 11. To counteract such a tendency a non-return valve 51 can be mounted in the region of the outlet end 7 of part 4, between the screw 3 and the die cavity 18.

Figure 5:
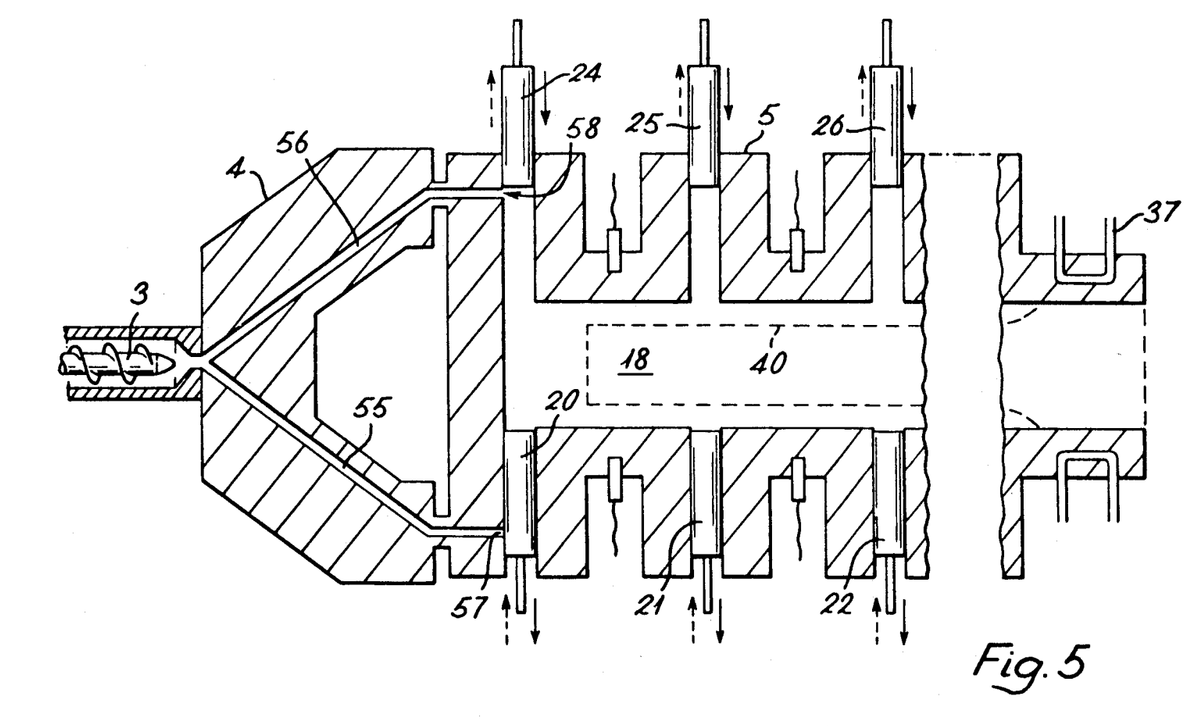
FIG. 5 is a diagrammatic longitudinal section through another extrusion die.

In the embodiment of the invention shown in FIG. 5, the related movements of the two pistons 20 and 24, closest to the extrusion screw 3, fulfil the same function as the separate non-return valve 51 as just described. In FIG. 5 the extruder screw 3 extrudes the melt through the first die part 4 by way of one of two passages 55, 56. These passages enter directly, by way of ports 57 and 58, into the bores 17 in which pistons 20 and 24 reciprocate. The bores 17 open directly into the cavity 18 of second die part 5, as before. If the movements of pistons 20, 24 are related so that they move in antiphase, then only when one of them is fully retracted (as piston 24 is in FIG. 5) will cavity 18 be in communication with the screw 3 and so permit the entry of more melt. At all other times the ports 57 and 58 will be closed by their respective pistons 20 and 24, so preventing any reverse flow which the melt within cavity 18 might otherwise have been free to make in response to the forces exerted upon it by reciprocating pistons 20-22, 24-26. In practice it may be arranged that the uncovering of either of ports 57, 58 coincides with a relaxation of the forces on all the pistons, so that there is at that time no tendency for back flow, and the minimum of resistance to the entry of further melt from screw 3. Reference 40 indicates, very approximately, the line of the molten/solid interface as seen in use in this section.

Figure 6:
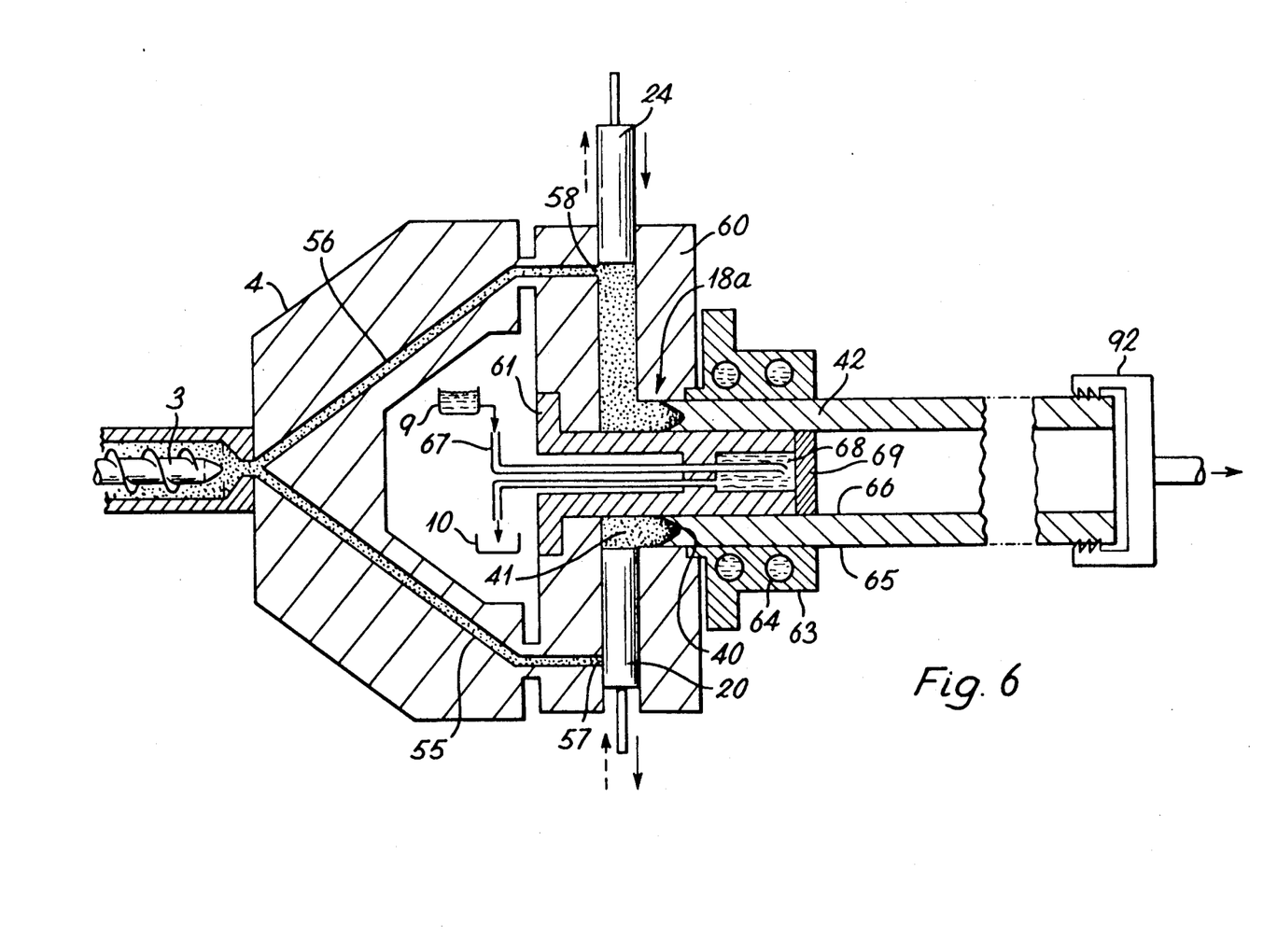
FIG. 6 is a similar section through a die for extruding tube.

The apparatus of FIG. 6 is for the extrusion of hollow tube, instead of the solid strip extruded by apparatus of previous figures. As in FIG. 5, melt extruded by screw 3 passes by way of channels 55, 56 into the bores of opposed pistons 20, 24 by way of ports 57, 58. The second part 5 of the die is now a composite structure comprising an outer section 60 and inner core 61. The tubular die cavity 18a, which the bores 17 of pistons 24 and 20 both enter, is defined between sections 60 and 61. As before, reference 40 indicates the interface between the liquid melt 41 and the solidified extrudate 42. Downstream of die part 5, a ring 63 formed with cooling channels 64 provides a cooling effect for the outer surface 65 of the extrudate that is comparable with the effect provided by ducts 37 in FIG. 1. The inner surface 66 of the extrudate is cooled by means of a system including cooling source 9, sink 10, channels 67 and a chamber 68 located at the downstream end of core 61 and sealed by a core end cap 69.

The diagrammatic sections of FIGS. 7 to 11 show that pistons 20 and 24, as shown in FIG. 5, belong to a set of four pistons including also pistons 70, 71. Unlike pistons 20 and 24, the bores 17 of pistons 70, 71 contain no ports connecting them to the extruder screw 3. FIG. 7 to 10 illustrate a sequence of operations of pistons 24, 20, 70 and 71 to promote, within each cross-section of the extruded product, an even distribution of alignable fibres or other elements around the circumference of the tube, and consistent alignment of those elements in a direction parallel to the circumference of the tube. In describing the positions and motions of the pistons, "in" and "inward" indicate towards the tube axis and "out" and "outward" away from it.

Figure 7:
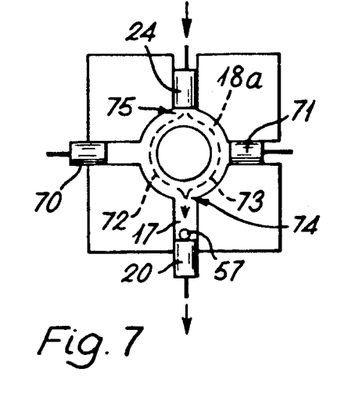
FIGS. 7 to 11 are schematic transverse sections through the die of FIG. 6, and illustrate a sequence of operations of such a die.
Figure 8:
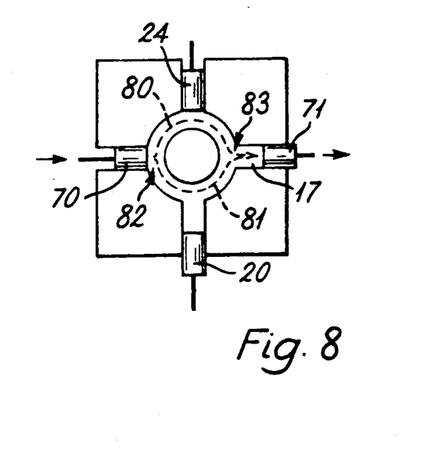
Figure 9:
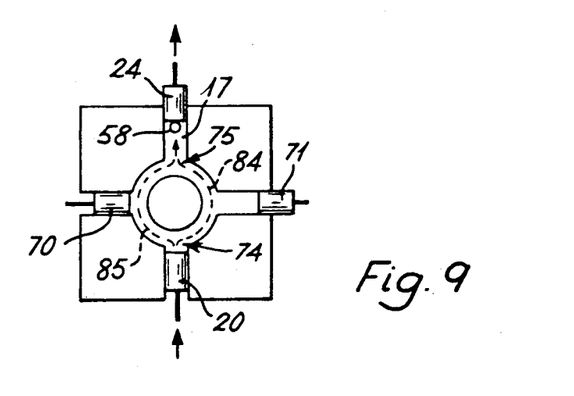

In FIG. 7 pistons 70 and 71 are respectively at the outward and inward ends of their strokes, and are stationary. However piston 24 and 20 respectively move to the inward and outward ends of their strokes. These motions therefore tend to align the fibres or other elements of the melt, within the cross-section of the tube containing the four pistons, to follow the two broken lines 72 and 73. As pistons 24 and 20 reach the end of their movement, port 57 is uncovered, so admitting a further charge of melt from screw 3 into cavity 18a. Were pistons 70 and 71 to remain stationary, and pistons 20 and 24 now to move in the reverse direction, the motion of fibres down lines 72 and 73 would reverse. If this simple reversal were then repeated, circumferential alignment of elements would undoubtably be achieved, but with obvious weaknesses down the circumference of the extruded tube at points corresponding to 74 and 75. To counteract this, the movements of FIG. 7 are succeeded by those of FIG. 8 in which piston 24 stays still, piston 20 moves inwards only so far as to cover port 57 and then stops, and pistons 70 and 71 move respectively to the inner and outer ends of their strokes. The elements now tend to align with lines 80 and 81, and 82 and 83 become the potential points of weakness. In stage three of the sequence, shown in FIG. 9, pistons 70, 71 do not move but pistons 20, 24 move respectively inwards and outwards, with piston 24 uncovering port 58 at the end of its stroke. The elements now tend to align with lines 84 and 85, and 74 and 75 become the potential weak points once more. In the fourth and final stage of the sequence shown in FIG. 10, piston 20 does not move, piston 24 moves inwards only so far as to cover port 58, and pistons 70, 71 move respectively outwards and inwards, so that the fibres align with lines 90, 91 and 82, 83 become the points of weakness again. The intended effect of the complete sequence is to promote the circular alignment of the elements during all piston movements, but to shift the points of weakness continually around the circumference of the melt, with the effect that in the final solid tube, there is no consistent axial line of weakness. After the fourth stage shown in FIG. 10, the sequence of piston movements may be repeated by beginning again at FIG. 7.

Figure 10:
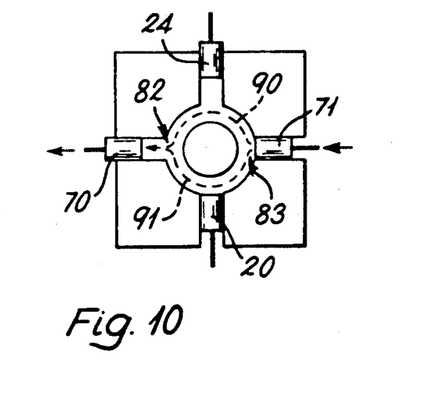
Figure 11:
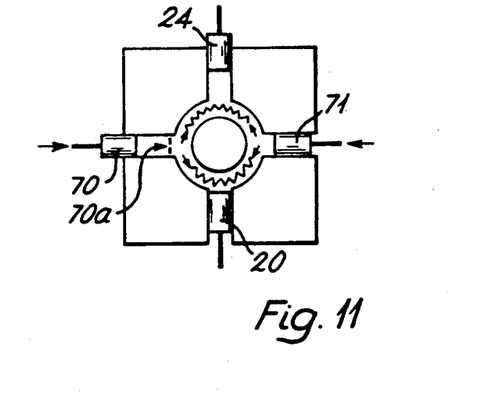

FIG. 11 shows a further, fifth stage that may be added to the sequence, or that can alternatively be inserted once after every predetermined number of repeats of the sequence of FIGS. 7 to 10. In FIG. 11 pistons 20, 24 and 71 remain in the positions in which they are shown in FIG. 10, but piston 70 moves inwards to the inner end of its stroke (as shown at 70a). With both of ports 57 and 58 closed, this movement of piston 70 has the effect of causing the melt pressure to rise, with the objective of using this pressure rise to expel a section of the solidified extrudate 42 from cavity 18a. Thus the force exerted by one of the pistons, whose primary purpose is element alignment, is being used in this instance to expel the finished tube from the die. Use of the pistons for this purpose, instead of relying upon the extruder screw 3 not just to supply the melt to the die but also to impart all axial movement to the melt and extrudate, opens the possibility of reducing the size and power of the extruder screw mechanism.

It is of course also within the scope of the invention to use a conventional haul-off mechanism—as shown schematically at 92 in FIG. 6, for instance—to cause or contribute to the extraction of the finished tube from the die.

Figure 12:
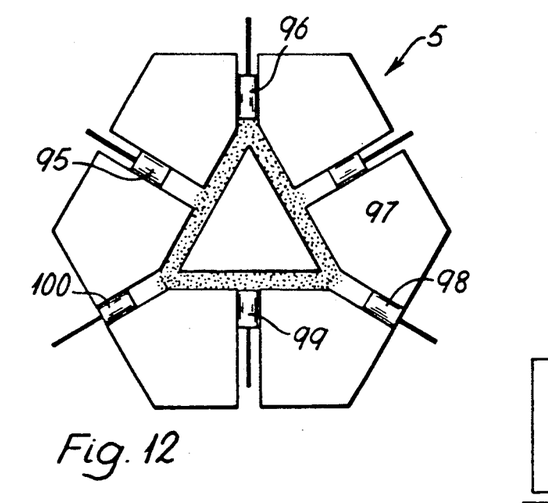
FIGS. 12 to 15 are schematic transverse sections illustrating the extrusion of products of yet further cross-sections.
Figure 13:
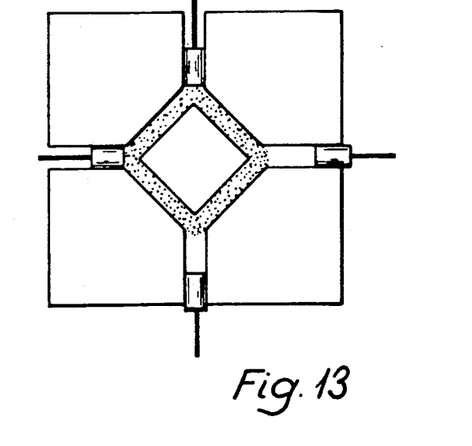
Figure 14:
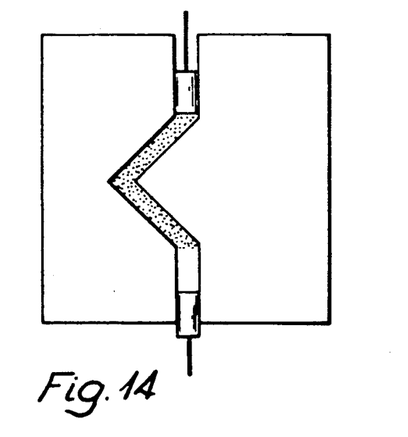
Figure 15:
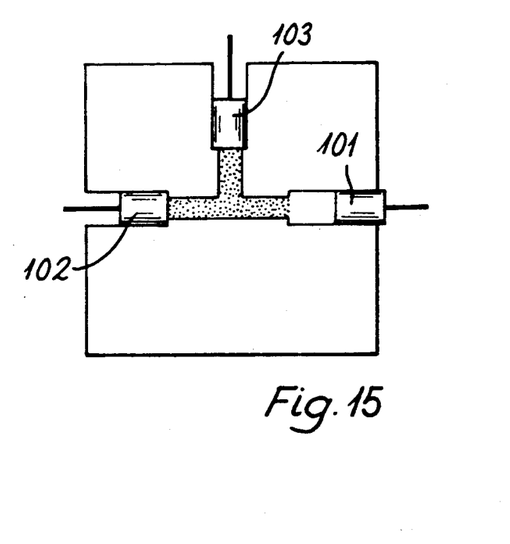

FIG. 12 shows a stage in the forming of a product of hollow triangular section, and also shows in outline an array of six pistons 95-100, the sequential operation of which is calculated to yield a product in which the fibres or other elements are all aligned in a direction parallel to the outline of the triangular section, and without consistent lines of axial weakness at either the vertices of the section or the mid-points of the sides. A possible such sequence of operation of pistons 95-100 might be: 96 in, 100 out; 96 out, 98 in; 98 out, 100 in; 95 in, 99 out; 95 out, 97 in; 97 out, 99 in. FIGS. 13 and 14 are similar views of products of box-section and V-shaped section respectively, and FIG. 15 is a similar illustration of the formation of a product of T-shaped section. In the formation of the product of FIG. 15, a possible sequence of operation of pistons 101-103, calculated to avoid any consistent lines of axial weakness within the product, might be; 101 in, 103 out; 103 in, 102 out; 102 in, 101 out.

Figure 16:
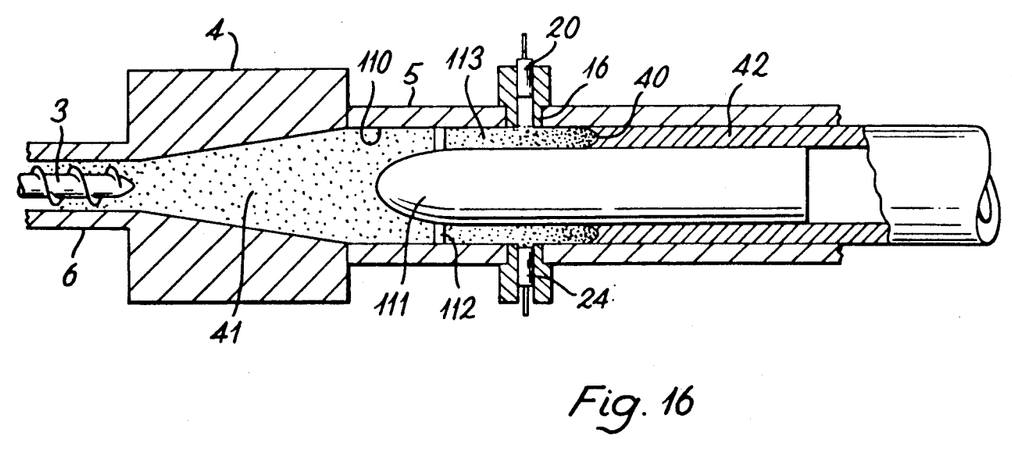
FIG. 16 is a schematic transverse section through yet another extrusion die.

FIG. 16 illustrates the application of the invention to a process of generally known kind for the extrusion of tube. In FIG. 16, the screw 3 provides the head pressure necessary to extrude liquid melt 41 through the first die part 4 and into the second, cylindrical die part 5, from the inner wall 110 of which a mandrel 111 is supported by slim legs 112, located at angular intervals around its circumference. Reference 113 indicates the tubular form of the extrudate, still molten, immediately after passing the legs 112 in the annular clearance between mandrel 111 and the inner wall 110 of part 5. As the extrudate continues to be driven along this annular clearance it cools, and a point is reached at which it ceases to be plastic and becomes solid: reference 40 indicates the solid/plastic interface as before. Downstream of interface 40 the solid product, ready for removal from the die by known means, is indicated by reference 42 as before. Cooling of the product may be promoted by cooling ducts or channels which are not shown in FIG. 16, but which may be similar to items 8a, 8b and 37 of previous Figures. Orientation of fibres or other constituents within the melt is promoted, as in previous Figures, by the synchronised operation of pistons (of which 20, 24 are shown) within bores 17, the mouths of which are located in the inner surface 110 of the die. The operation of these pistons may, as before, have some useful effect of achieving some transverse alignment of fibres or other constituents within the product in its tubular and still-molten state (113) so that that alignment becomes "locked in" to the final, solid product (42) at the interface 40. In this embodiment of the invention, however, the action of the pistons has the further and useful effect of destroying any unwanted orientation of fibres and other constituents, that might otherwise result within the plastic extrudate due to it first parting around each of the legs 112, and then recombining. Without this use of the invention, the final product 42 could be expected to exhibit lines of axial weakness at intervals around its circumference, the intervals corresponding to the spacing of legs 112.

The principal advantage of an extruded product containing fibres or other elements aligned transversely by the process of this invention is that it will be stronger in the transverse direction and more formable, that is to say easy to bend, about transverse axes. In a product with pronounced edges, like the strips of FIGS. 1, 14 and 15 for example, any edge blemishes resulting from the fact that the edges cannot solidify until they have passed the full range of the heating elements can easily be avoided by edge trimming, or in a stamped product by confining the stamping to the unblemished central area of the product.

Further composite materials that lend themselves to the process of the present invention include other fibre-reinforced thermoplastics, thermosetting materials, and fibre-reinforced particulate-filled thermoplastics, the latter category including in particular ceramic-matrix and metal-matrix compositions processed with the aid of polymer binders. Further homogeneous materials include amorphous thermoplastics such as polycarbonates, liquid crystalline polymers, and semicrystalline thermoplastics such as polyethylene and polypropylene.

We claim:

1. A method for the continuous formation of extrudable material into an extruded product, comprising in sequence:
   extruding the material in the direction of an extrusion axis and with change of cross-section through a first die part;
   subjecting the extrudate so produced to a pressure head within, and causing the extrudate to move lengthwise through a second die part (5) presenting a die cavity;
   promoting solidification of the extrudate while within the second die part;
   subjecting the extrudate to pulsating displacements by at least two moveable displacement means communicating with the second die part at transversely separated regions of the periphery of the cross section of said second part, the movements of the displacement means being synchronized so that as one such means advances within one region of the periphery another such means withdraws within a separated region of the periphery, the displacements having a transverse component of direction relative to the extrusion axis, and thereby inducing a movement of the material with a transverse component of direction relative to said extrusion axis;

causing the extrudate to solidify, and removing the extrudate from the second die part after solidification.

2. A method according to claim 1 in which the said cavity of the said second die part presents a wall, and the displacement means work within chambers leading off from the said wall.

3. A method according to claim 1 in which solidification of the extrudate is promoted by applying positive cooling to the surface of the extrudate by way of cooling medium flowing through cooling ducts within the second die part.

4. A method according to claim 1 in which solidification of those parts of the surface of the extrudate passing close to the displacement means is delayed, relative to the solidification of the remainder of the extrudate surface.

5. A method according to claim 4 in which heating is applied to those parts of the surface of the extrudate passing close to the displacement means.

6. A method according to claim 1 in which the material passes through a non-return valve before being subjected to the pulsating displacements, to prevent those displacements causing back flow of material into the first die part.

7. A method according to claim 6, in which at least one of the displacement means serves also as the non-return valve.

8. A method according to claim 1 in which the extrudate is hollow when viewed in transverse section and presents an outer periphery, and in which the directional movement of the material is in a direction substantially parallel to the said outer periphery of the transverse section.

9. A method according to claim 8 in which the extrudate has a polygonal shape when viewed in transverse section.

10. A method according claim 8 in which the extrudate has a circular or other curved shape when viewed in transverse section.

11. The method according claim 8 in which positive cooling is applied to both the outer and the inner surfaces of the hollow extrudate.

12. A method according to claim 8 in which displacements are set up by predetermined movement of displacement means located at at least three separated peripheral regions, and in which the predetermined movements repeatedly to promote a peripherally even and uniform directional movements of the material.

13. A method according to claim 1 in which force exerted by the moveable displacement means contributes not only to the said directional movement of the material, but also to removing the extrudate from the second die part after solidification.

14. A method according to claim 1 in which the extrudate is T-shaped in transverse section.

15. A method according to claim 1 in which the extrudate is V-shaped in cross-section.

16. A method according to claim 1 in which the displacement means are pistons working in cylinders communicating with the said cavity of the second die part.

17. A method according to claim 1 in which the extrudate has the cross-sectional shape of an elongated rectangle, having long and short side and in which the displacement means confront the short sides of that rectangular section.

18. A method according to claim 1 for continously forming an extractive product from a composite material comprising a plastics base and a filler.

19. A method according to claim 17 for continuously forming an extruded product from an homogeneous material in which molecular formations or other structural constituents are capable of useful physical alignment.

20. A method according to claim 1 in which a solid/melt interface is generated within the extrudate when within the second die part, and the melt is subjected to the synchronized movements of the displacement means at that interface.

21. A method according to claim 1 in which obstacles are present within at least one of the first and second die parts, requiring the extrudate to divide and then recombine to avoid said obstacles while passing through the die, and in which the operation of the shearing action has the effect of removing unwanted orientation of the constituents that would otherwise result from the dividing and recombining.

22. Apparatus for the continuous formation of extrudable material into an extruded product, comprising:
first and second die parts, presenting a common extrusion axis;
a die cavity presented by said second die part;
means for subjecting the product of said extrusion to a pressure head within, and causing it to move in the direction of said extrusion axis through said die cavity of said second die part;
at least two movable displacement means for communicating with said die cavity at locations that are transversely separated relative to said extrusion axis; and
means for synchronizing the movements of said displacement means so that as one of said displacement means advances at one of said locations another of said displacement means withdraws at a transversely separated location,
wherein said extrudable material is subjected to transverse displacement by synchronized movements of said displacement means within said die cavity.

23. A method according to claim 1 in which the material contains alignable constituents susceptible to alignment or other ordered orientation, and the pulsating displacement of the moving displacement means induce a resultant orientation of said constitutents by the operation of a shearing action.

24. A method according to claim 18 in which the filler is in the form of elongated particles.

25. A method according to claim 24 wherein the elongated particles are glass fibres.

* * * * *